United States Patent Office 2,783,255
Patented Feb. 26, 1957

2,783,255

7,14α,17α,21-TETROXY PROGESTERONES

Gilbert M. Shull, Huntington Station, Donald A. Kita, Jackson Heights, and Jacob W. Davisson, Levittown, N. Y., assignors to Chas. Pfizer & Co., Inc., Brooklyn, N. Y., a corporation of Delaware No Drawing. Application March 12, 1954,
Serial No. 415,972

3 Claims. (Cl. 260—397.45)

This invention is concerned with a method for the separation of steroid compounds which are formed when Reichstein's Compound S is subjected to the oxygenating activity of a fungus from the genus Curvularia, and with certain new oxygenated products thus separated, and derivatives of these new products.

The present application is a continuation-in-part of parent application Serial No. 322,578, filed on November 25, 1952, by Gilbert M. Shull et al. Another continuation-in-part thereof has issused as U. S. Patent No. 2,658,023, and still another continuation-in-part was filed on November 2, 1953, and given Serial No. 389,886.

In the above-mentioned earlier filed applications it was disclosed that 11-β-hydroxy steroid compounds and in particular Kenrall's Compound F, 17-hydroxycorticosterone, may be prepared by subjecting 11-desoxy steroid compounds, particularly Reichstein's Compound S, 11-desoxy-17-hydroxycorticosterone, to the oxygenating activity of selected cultures of microorganisms. Other products, referred to briefly in the earlier applications, are also obtained from this process, and it is with some of these other products that this present application is particularly concerned, with special reference to the method of recovering, purifying and crystallizing these substances from mixtures containing such substances as Compound F and Compound S. Besides the compounds which have been isolated and characterized herein, other compounds as yet uncharacterized are obtained.

The procedure for preparing Compound F from Compound S is described in detail in U. S. Patent No. 2,658,023, and that material is incorporated by reference as a part of this application. That procedure may be outlined as comprising contacting 11-desoxy steroid, e. g. Compound S, with the oxygenating activity of an organism chosen from the genus Curvularia, which genus belongs to the order Moniliales, of the class Fungi Imperfecti. When this reaction is carried out, there is obtained a mixture of starting material and oxygenated steroids. It has been found that in addition to Compound F there are formed certain derivatives of Compound S having at least two added hydroxyl groups.

It has now been discovered that the separation of these compounds (Compound F, Compound S and the polyhydroxylated derivatives) may readily be accomplished by means of a process comprising the steps outlined below.

A partition chromatography column is prepared from a mixture of silica gel and a lower alcohol, for example ethanol. To this column is applied the crude biooxygenation mixture dissolved in a non-polar organic solvent, the chlorinated lower hydrocarbons such as chloroform, methylene chloride, dichloroethane and propylene chloride being especially useful. The adsorbed mixture is then separated into its components and eluted by the gradual addition of mixtures of the non-polar solvent with increasing amounts of a polar solvent such as a low molecular weight alcohol.

As the amount of polar solvent in the eluting mixture is gradually increased, a typical mixture of steroids is freed from the column in the following order:

(1) Unreacted Compound S.
(2) A steroid here called LP-3 which is less polar than Compound F.
(3) A steroid as yet uncharacterized which we call LP-2.
(4) A steroid here called LP-1 which is less polar than Compound F.
(5) Compound F.
(6) A steroid here called MP-1 which is more polar than Compound F.
(7) Three more steroids as yet uncharacterized.

The letters LP and MP are derived from the words less polar and more polar, respectively. The order of polarity of these compounds may vary with various solvent-adsorbent systems.

The unreacted Compound S and the compounds less polar than Compound F are removed from the column when the eluting agent contains, for instance, about 2–4% ethanol (by volume) in methylene chloride. If the partition chromotography is continued using about 5% ethanol (by volume) in methylene chloride, Compound F and then the more polar compounds are eluted. A check may be kept upon the process by submitting samples of the eluted materials to paper chromatography tests, comparing the eluted materials to known samples used as controls.

The solutions, each containing a dissolved steroid, which are recovered from the chromatography column, are evaporated to dryness, and the solid steroids recovered therefrom. It has been found that LP-1 and MP-1 may be obtained as pure crystals by recrystallizing them from a solution using a low molecular weight, polar, organic solvent, such as methanol or acetone.

The compound LP-1 has been shown to be 7,14α,17α,21-tetrahydroxyprogesterone, a substance formed by introducing two hydroxy groups into Compound S. The configuration of the hydroxyl group introduced at the 7 position is not yet known. The compound MP-1 has been shown to be 11β,14α,17α,21-tetrahydroxyprogesterone, a substance also formed by introducing two hydroxy groups into the Compound S molecule.

PROPERTIES OF LP-1

An elemental analysis of LP-1 shows it to be a $C_{21}H_{30}O_6$ compound, that is a dihydroxy derivative of Compound S. Anal.: Calcd. for $C_{21}H_{30}O_6$: C, 66.64; H, 7.99. Found: C, 66.57, 66.53; H, 8.11, 8.02. This analytical sample was prepared by a double recrystallization from acetone. It exhibited M. P. 238–240° C., with decomposition;

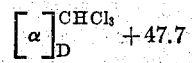

ultraviolet absorption maximum at 238 mμ in ethanol. It infrared absorption spectrum showed bands at 3.0μ, 3.15μ, 5.85μ and 6.13μ. The ultraviolet absorption spectrum is indicative of an α,β-unsaturated ketone and the compound gives a positive triphenyltetrazolium reaction. Its behavior on paper chromatography also indicates that it is a derivative of Compound S containing two added hydroxy groups. The acetate of LP-1, prepared in the usual manner and recrystallized from 1:1 methanol-water, exhibited M. P. 193–194°;

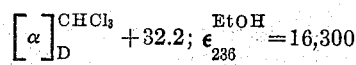

Acetyl determination: Calcd. for monoacetate 10.19%; for a diacetate 18.45%. Found: 19.91%.

Dehydration of LP-1 occurs readily in 1% ethanolic potassium hydroxide at room temperature to give a product with ultraviolet absorption at 283 mμ ε=23,500. By subjecting LP-1 to acid treatment with p-toluenesulfonic acid in refluxing benzene, there is obtained a product having an ultraviolet spectrum with a maximum of 343 mμ.

Additional chemical studies, including degradation, have shown the structure of LP-1 to be 7,14α,17α,21-tetrahydroxyprogesterone. The diacetate referred to above has been shown to be that formed by esterification at the 7 and 21 positions, and its name is therefore 7,14α,17α,21-tetrahydroxyprogesterone-7,21-diacetate. As the compound LP-1 is a highly oxygenated steroid, possessing many centers of potential chemical activity, and as the compound is very unusual in having OH groups at both the 7 and 14 positions, it is of very great interest as a starting material for the synthesis of other novel steroids. It is also possible to use it as a starting material for the synthesis of Compound F. This can be accomplished by dehydration and hydrogenation to yield Compound S, which may then be resubjected to the action of Curvularia.

The structural formula for LP-1, 7,14α,17α,21-tetrahydroxyprogesterone, is as follows:

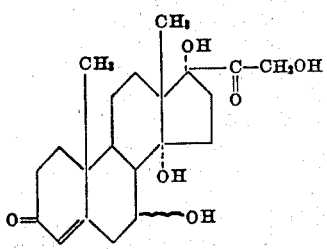

The wavy line connecting the 7-OH group to the nucleus is used in accord with the standard system to indicate that, while the position is certain, the configuration of the group is not known. It may be α, or it may be β.

Both the 7-OH and the 21-OH groups may readily be esterified and etherified by the usual methods. A wide group of esters and ethers have been prepared by these means. For example, useful groups include formate, acetate, propionate and benzoate among the esters, and methyl, ethyl and benzyl among the ethers.

PROPERTIES OF MP-1

An analytical sample of MP-1, twice recrystallized from methanol, exhibited the following properties: M. P. 231.6-233.4° C.; optical rotation $$\left[\alpha\right]_D^{EtOH} +188.4°, \left[\alpha\right]_{Hg}^{EtOH} +215.4°$$

ultraviolet adsorption $$\epsilon_{243}^{EtOH} \ 15,850$$

Analysis: Calculated for $C_{21}H_{30}O_6 \cdot \frac{1}{2}CH_3OH$: C, 65.46; H, 8.18. Found: C, 65.28; H, 8.13. The behavior of this compound on paper chromatography indicates that it is a derivative of Compound S containing two added hydroxyl groups, and the formula $C_{21}H_{30}O_6$ is consistent with this belief. Additional investigations of MP-1, including molecular rotation calculations, infrared studies, and degradation, have shown its structure to be 11β,14α,-17α,21-tetrahydroxyprogesterone. Most significantly, it has also been shown that this compound gives a positive liver glycogen test and a positive thymus involution test. These are standard tests which prove the presence of cortical activity, and this compound has been shown to possess activity equivalent to that of the very valuable Compound F.

When MP-1 was treated with acetic anhydride and pyridine at room temperature, a monoacetate was formed. Following recrystallization from methanol, this compound had the following physical constants: melting point 212-213° C.;

$$\left[\alpha\right]_D^{dioxane} +179.1°; \epsilon_{241}^{EtOH} \ 16,200$$

acetyl determination, found 9.89, calculated for 1 acetyl group, 10.19. Chemical analysis: Calculated for $C_{23}H_{32}O_7 \cdot CH_3OH$, C, 63.70; H, 8.01; found C, 63.83, H, 8.09. This compound is therefore 11β,14α,17α,21-tetrahydroxyprogesterone-21-acetate. It also possesses very great cortical activity, as shown by positive liver glycogen and thymus involution tests.

The structural formula for MP-1, 11β,14α,17α,21-tetrahydroxyprogesterone, is as follows:

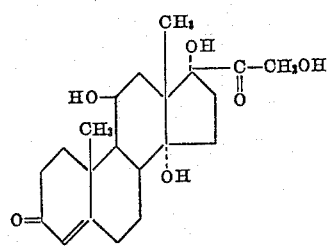

The 21-OH group in this molecule may readily be esterified and etherified by the usual methods. A wide group of esters and ethers have been prepared by these means. For example, useful groups include formate, acetate, propionate and benzoate among the esters, and methyl, ethyl and benzyl among the ethers.

These new compounds are also useful intermediates in the synthesis of medicinally important steroid compounds. The introduction of hydroxyl groups imparts to the molecule more centers of chemical reactivity, and enables it to undergo more reactions, for example, the acetate formations illustrated above. Besides acetates, a wide variety of esters such as benzoates, formates, succinates and propionates, and of ethers such as ethyl, benzyl and methoxymethyl, may be formed.

The following example is given by way of illustration and is not intended as a limitation of this invention. Indeed, as many apparently widely different embodiments of the present invention may be made without departing from the spirit and scope hereof, it is to be understood that the invention is limited only as defined in the appended claims.

Example

Compound S was treated as described in Example III of the above mentioned U. S. Patent No. 2,658,023, with the mycelium from a culture of Curvularia lunata (Q. M. 120 h) grown as described therein. The combined chloroform extracts of the reaction mixture, obtained as described in that example, were evaporated to dryness, and a dry mixture of steroids was obtained. This reaction was repeated several times, and one gram of the produced dry mixture of steroids was used in this present example.

37 gms. of silica gel (20-200 mesh) was mixed with 37 ml. of 95% ethanol and the resulting slurry was transferred with methylene chloride into a glass column 20 cm. high and 2 cm. in inside diameter. One gram of the crude dry mixture of steroids, obtained as described above, was dissolved in 5 ml. of chloroform and applied to the column. The column was washed with 200 ml. of chloroform and then developed. The solvent for the developing consisted of mixtures of methylene chloride and 95% ethanol. The ratio of methylene chloride to ethanol started out as 98:2 on a volume basis, and at the end was up to 95:5, to remove the more polar compounds.

A fraction of eluate, having a volume of about 50 ml., was collected every two hours. Compound S was recovered in fractions 3-5. Compound LP-3 was recovered in fractions 6-8. A compound as yet uncharacterized was found in fraction 9. Fractions 10-12 contained LP-1, and fractions 13-26 contained Compound F. Compound MP-1 was found in fractions 27-30. Mixtures of as yet uncharacterized compounds were found in subsequent fractions. These may be separated by further chromatography.

What is claimed is:
1. A new steroid compound

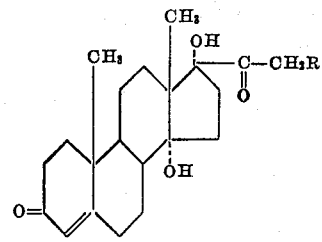

having at the 7-position and at R substituents each of which is selected from the class consisting of —OH, —OOCH, —OOC—CH₃, —OOC—CH₂—CH₃, —OOC—C₆H₅, —OOC—CH₂—CH₂—COOH, —O—CH₃, —O—CH₂—CH₃, —O—C₆H₅ and —O—CH₂—O—CH₃.

2. A compound according to claim 1 wherein both substituents are hydroxyl.

3. A compound according to claim 1 wherein both substituents are OOC—CH₃.

References Cited in the file of this patent
UNITED STATES PATENTS

| | | |
|---|---|---|
| 2,602,769 | Murray et al. | July 8, 1952 |
| 2,658,023 | Shull | Nov. 3, 1953 |